Aug. 23, 1932.  V. M. PYATT  1,873,215
GARDEN IMPLEMENT
Filed Jan. 29, 1932
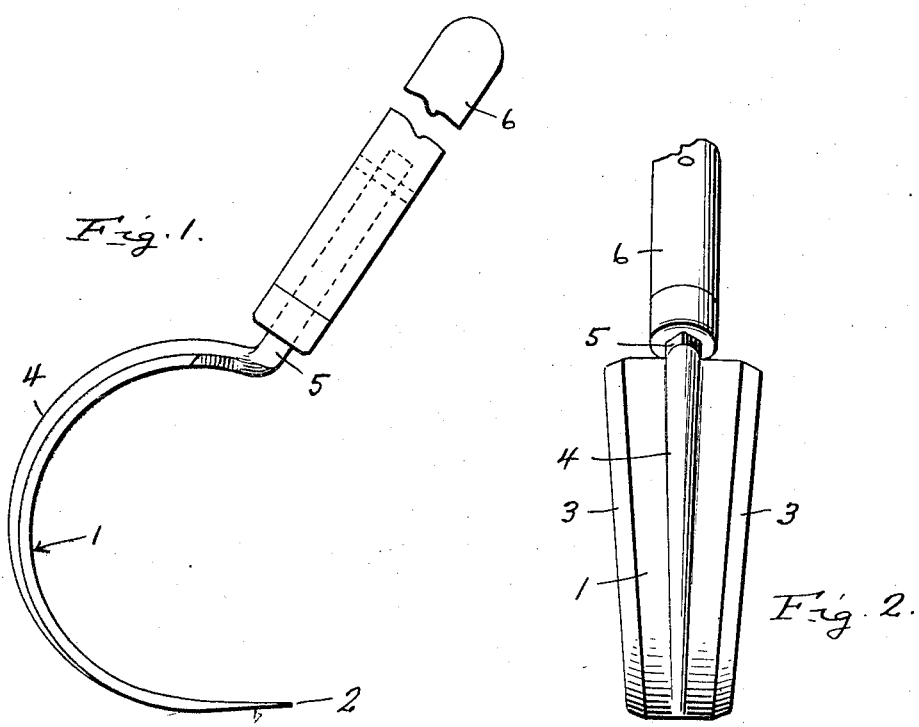
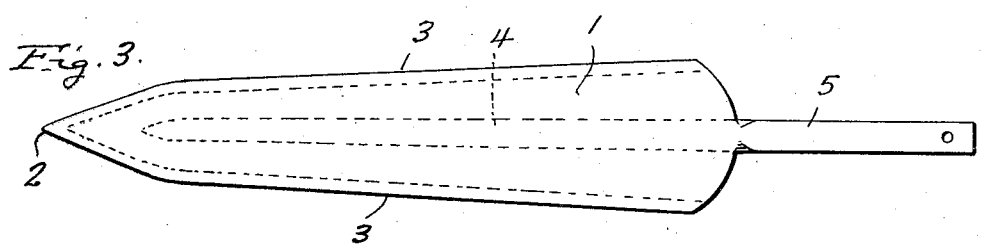
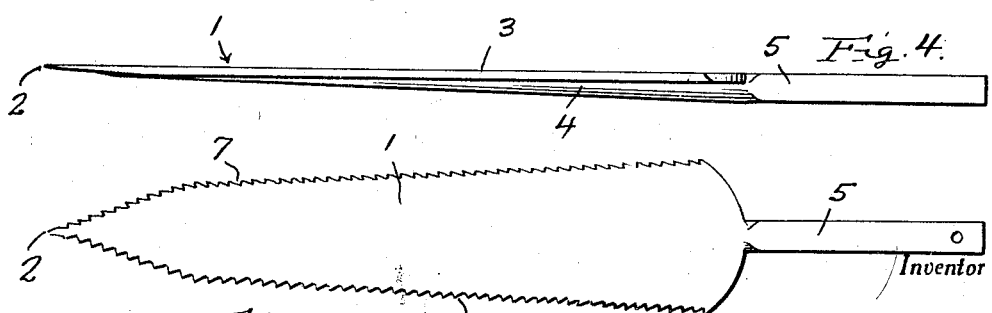
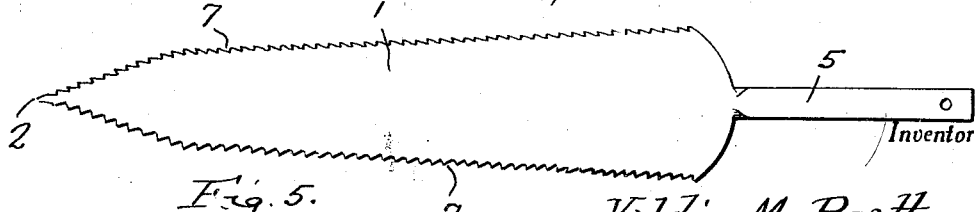
Inventor
Valdis M. Pyatt
By Clarence A. O'Brien
Attorney

Patented Aug. 23, 1932

1,873,215

UNITED STATES PATENT OFFICE

VALDIS M. PYATT, OF GREAT FALLS, MONTANA

GARDEN IMPLEMENT

Application filed January 29, 1932. Serial No. 589,748.

The present invention relates to garden implements and more particularly to a hoe and has for its primary object to provide, in a manner as hereinafter set forth, a device of this character embodying a novel construction through the medium of which the hoe is useful as a weed and grass cutter for pruning purposes, etc.

Other objects of the invention are to provide a garden implement of the character set forth which will be simple in construction, strong, durable, efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in side elevation of a garden implement constructed in accordance with the present invention.

Figure 2 is a view in front elevation thereof.

Figure 3 is a view of the blade showing the same before being curved.

Figure 4 is a view in side elevation of the blade before said blade is curved.

Figure 5 is a view in elevation of a slightly modified form of the invention showing the blade before it is curved.

Referring now to the drawing in detail, it will be seen that the reference numeral 1 designates an elongated blade of spring steel, which tapers to a point 2 at its free end. The edges of the blade 1 are sharpened from the point 2 to the rear end of said blade in a manner to provide the cutting knife edges 3.

Formed integrally with the back of the blade 1 is a reinforcing rib 4 which progressively decreases in size toward its forward end until it merges with the blade. At its rear end, the rib 4 merges with a shank 5 which projects at an angle from the blade for insertion in a socket provided therefor in one end portion of a handle 6. The shank 5 is of square cross section. While Figs. 3, 4 and 5 show the blade as being flat it is to be understood that the blade is to be curved to the arcuate form shown in Figs. 1 and 2.

Thus, a tool has been provided which may be used for several purposes. The blade 3 is particularly constructed for sub-soil work and the cutting edges 3 provide means for conveniently severing weeds or grass. Through the medium of the knife type cutting edges 3, the blade 1 may be used somewhat in the manner of a draw knife.

In the modified form of the invention illustrated in Figure 5 of the drawing, the blade 1 is provided with saw teeth 7 which extend from the point thereof to the rear end of said blade. In all other respects, the blade illustrated in Figure 5 is similar to that shown in Figures 1 to 4, inclusive, of the drawing. When the blade is equipped with saw teeth, the same may conveniently be used for pruning purposes particularly.

The blade 1 may, if desired, have one longitudinal edge provided with saw teeth and its other longitudinal edge provided with a knife cutting edge. Also, if desired, each longitudinal edge of the blade 1 may be provided with saw teeth from the rear end thereof to a point in spaced relation to the free end of said blade, the rest of the longitudinal edges being provided with knife cutting edges. The square shank 5 prevents turning of the blade in the handle, as will be apparent.

The implement is superior to others by reason of the fact that it can be used in parks among shrubbery, rose bushes, for hoeing or cultivating and trimming, thereby rendering unnecessary the use of any other implement.

It is believed that the many advantages of a garden implement constructed in accordance with the present invention will be readily understood, and although the preferred embodiments of the invention are as illustrated and described, it is to be understood that further changes in the details of construction and in the combination and arrangement of parts may be resorted to which will fall within the scope of the invention as claimed.

What is claimed is:—

A garden implement comprising an elongated, arcuate metallic blade of spring material, terminating, at one end, in a point, the longitudinal marginal portions of said blade being sharpened to provide cutting edges from the point to the other end thereof, a shank formed integrally with the other end of the blade and extending from said blade at an angle relative thereto, and a reinforcing rib formed integrally with the outer face or convex side of the blade and merging, at one end, with the shank, said rib progressively decreasing in size toward its other end and merging with the blade at said other end, said blade gradually increasing in width from the pointed end to the shank end and the inner face of the blade being plain and the rib being rounded and a handle mounted on the shank.

In testimony whereof, I affix my signature.

VALDIS M. PYATT.